Patented Jan. 2, 1923.

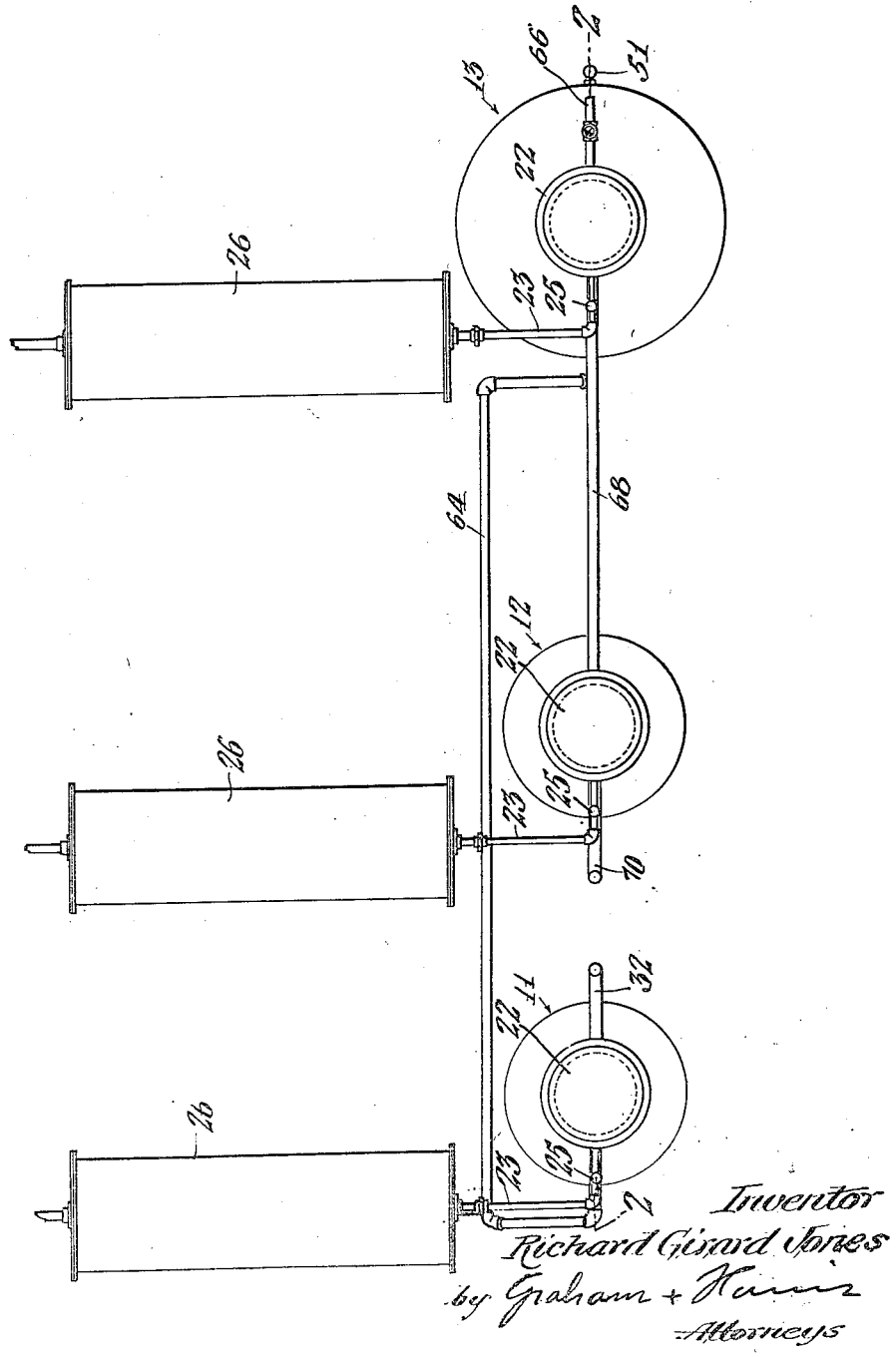

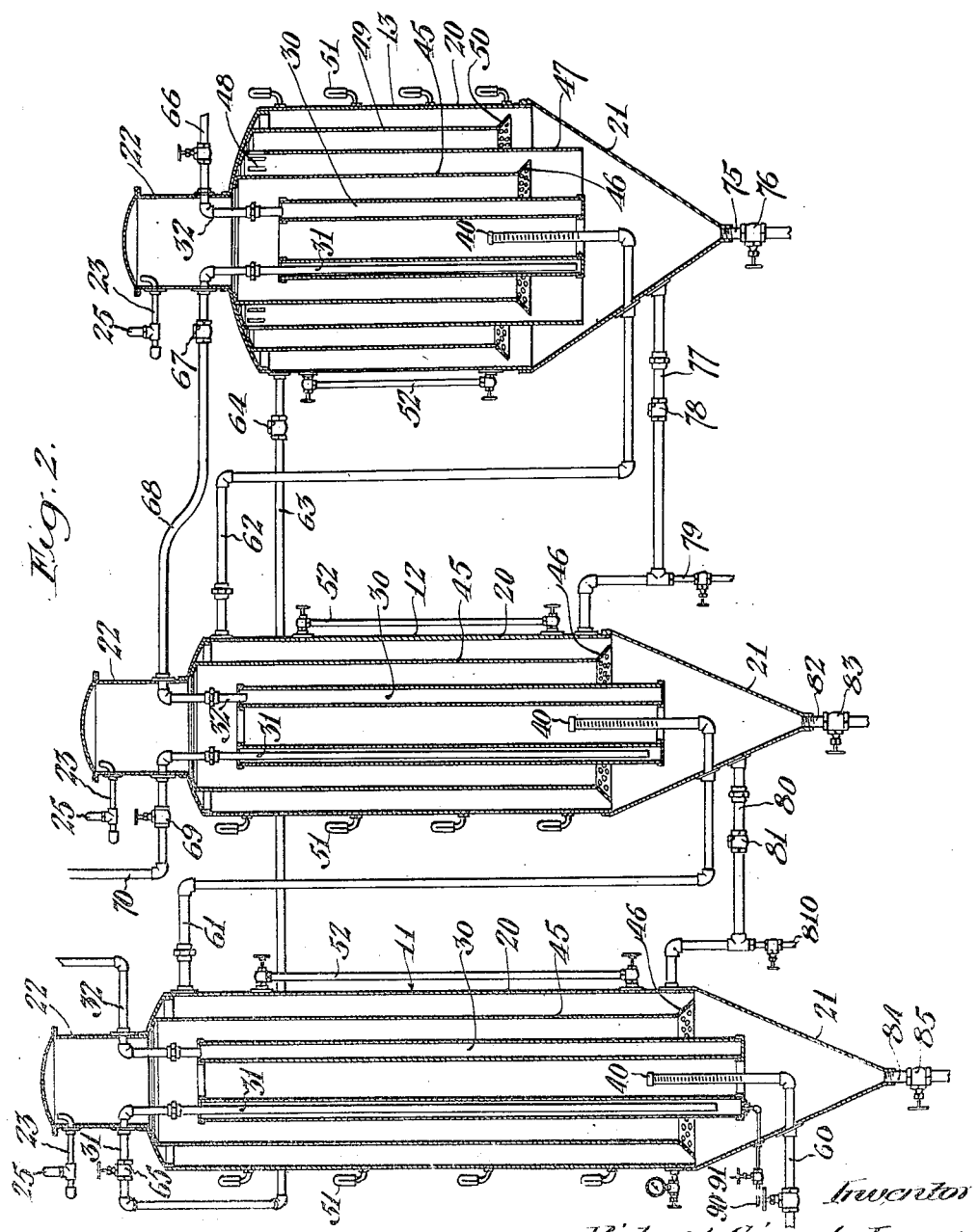

1,440,832

UNITED STATES PATENT OFFICE.

RICHARD GIRARD JONES, OF LOS ANGELES, CALIFORNIA, ASSIGNOR TO BROWN PROCESS COMPANY, OF LOS ANGELES, CALIFORNIA, A CORPORATION OF CALIFORNIA.

APPARATUS FOR DEHYDRATING AND CLEANING OILS.

Application filed February 7, 1921. Serial No. 443,087.

*To all whom it may concern:*

Be it known that I, RICHARD GIRARD JONES, a citizen of the United States, residing at Los Angeles, county of Los Angeles, and State of California, have invented a new and useful Process of an Apparatus for Dehydrating and Cleaning Oils, of which the following is a specification.

My invention relates to the art of removing water and other impurities from oils and is particularly applicable to mineral oils. It has a very great utility in the removal of water and water soluble substances from petroleum oils and the following specification will be limited to this application of the invention.

Referring to the drawing which is for illustrative purposes only.

Fig. 1 is a plan view of my invention.

Fig. 2 is an elevation partly in section on a plane represented by the line 2—2 of Fig. 1.

In the embodiment of my invention shown, I employ three units 11, 12 and 13, which are similar although not duplicates in construction. Each unit comprises a shell 20 having a conical bottom 21 and a vapor dome 22 from which vapor may be withdrawn through a pipe 23 which has a relief valve 25. Each pipe 23 leads to a condenser 26 in which the vapor withdrawn may be collected, or when there is enough vapors given off to increase the temperature of the cold incoming oil an appreciable amount, then these vapors should be conducted to a duplicate of unit 11, the vapor condensing in chamber 20 and condensation withdrawn through pipe 90, valve 91, the cold oil being supplied as in unit 11.

In the normal operation of my invention, however, I try to produce as little vapor as possible as will hereinafter be explained.

Centrally located in each of the shells 20 is an annular chamber 30, having a tight top and bottom, each of these chambers having a heating medium inlet pipe 31 which extends to a point near the bottom thereof and a heating medium outlet pipe 32 which is connected into the top of the annular chamber 30. A perforated oil inlet pipe 40 extends into a central opening surrounded by the annular chamber 30. Inside the shells 20 of the units 11 and 12 is an apron 45 which is provided at the bottom with a perforated distributor 46. In the unit 13 is a similar apron 45 and distributor 46 is provided, and an intermediate apron 47 is also provided extending downwardly beyond the distributor 46 and being provided with perforations 48 near the top thereof. An outer apron 49 is also provided having a perforated distributor 50. Thermometers 51 are placed at convenient points on the treaters and water glasses 52 are also provided.

The method of connection and operation may be described together.

The oil to be treated is supplied through a valve 60 to the oil inlet pipe 40 of the first unit 11, passing up through the central opening inside the annular chamber 30 which is supplied with heating medium as will be hereinafter explained.

The oil is, therefore, heated in its upward passage. The heated oil then passes downwardly outside the annular chamber 30 and inside the apron 45. Water is maintained in the unit 11, this water entirely covering the distributor 46, and partially filling the space in the central opening inside the central chamber 30. The oil is, therefore, passed through this water, the distributor 46 breaking the oil up into small streams so that it can readily contact with the water. In its passage through the water, the oil gives up a portion of its emulsified water and water soluble impurities. The partially treated oil is passed through a pipe 61 from the first unit 11 into the oil inlet pipe 40 of the second unit 12, in which the oil is further heated, this oil being passed through the distributor 46 and thoroughly washed as before. This heated and treated oil is delivered through a pipe 62 into the oil inlet pipe 40 of the third unit 13. This oil passes upwardly through the central opening inside the annular chamber 30, then downwardly and through the distributor 46, upwardly and through the openings 48, downwardly and through the distributor 50, being finally withdrawn through a pipe 63. In its passage through the distributors 46 and 50, the oil is passed through water which is maintained about midway in the gauge glass.

It will be noted that the oil is heated in its passage through the units 11, 12 and 13 to increasing temperatures.

It will also be noted that it is subjected to a washing action in each of the units. In its passage through the successive bodies of water, the emulsion is broken, the water being collected therefrom so that clean oil is withdrawn through the pipe 63, all water soluble impurities in the oil are also removed.

The heated oil delivered through the pipe 63 passes through a check valve 64 which is set to prevent its return into the unit 13, this oil being delivered through a valve 65 into the heating medium inlet pipe 31 of the first unit 11. This hot oil passes through the annular chamber 30, providing the heat necessary for the operation of the first unit 11, the treated and partially cooled oil being withdrawn through the pipe 32 and delivered to suitable storage.

For the purpose of heating the annular chamber 30 of the third unit 13, I provide a steam pipe 66 which is connected to the pipe 32 delivering steam into the top of the annular chamber 30, this steam providing the heating medium for the third unit 13. This steam is partially condensed in the chamber 30 flowing downwardly and being delivered to the pipe 31, passing through a check valve 67 which prevents its return and through a pipe 68 into the top of the heating unit 30 of the second unit 12. Considerable condensation takes place in this annular chamber 30, the condensed water and steam being withdrawn through the pipe 31 and being delivered through a valve 69 to a drain pipe 70. A sludge draw-off pipe 75 is provided for the unit 13, being provided with a valve 76 which is normally closed. This valve may, however, be opened for the purpose of withdrawing any accumulated solids from the bottom of the unit 13. The water removed from the oil in unit 13 is allowed to collect until shown midway in the gauge glass, the surplus water passing through a pipe 77 and a check valve 78 which is set to prevent its return into the unit 13. This surplus hot water is injected into the unit 12 by a steam injector supplied by steam through a steam pipe 79. The hot water so injected mingles with the water in unit 12. Water is removed from unit 12 through a pipe 80 and a check valve 81 which is set to prevent its return and is injected into unit 11 by means of a steam injector supplied with steam by a pipe 810 into the first unit 11.

The second unit 12 is provided with a sludge draw-off pipe 82 controlled by a valve 83, the valve 83 being normally closed but being opened from time to time to allow any solid accumulations in the bottom of the unit 12 to be withdrawn.

The unit 11 is also provided with a water outlet pipe 84 controlled by a valve 85. The valve 85 is normally partially opened and the water removed from the oil in the units 11, 12 and 13 finally escapes from this valve. A small pipe 90 controlled by valve 91 allows any accumulation of water to be withdrawn from the annular chamber 30 from the first unit 11.

By partially closing the valve 65 and supplying the oil to the apparatus through the pipe 60 under some pressure, it is possible to operate the three units under a moderate pressure. It is also possible by controlling the steam supply delivered through the pipe 66 to regulate the temperature in the different units. In some cases it is desirable to use only one unit and in some cases four or more may be necessary. The temperature, the pressure and the number of units depend upon the character of the oil to be treated.

It will be noted that my invention comprises the general conception of passing the oil to be treated through water baths in a finely divided and in a heated condition, the amount of heat necessary depending upon the character of the oil to be treated.

It further comprises the idea of successively washing and heating the oil and of utilizing the heated oil from the last unit to heat the incoming oil in the first unit.

It further, of course, comprises the idea of using the comparatively cool oil in the first unit to cool the more highly heated oil from the last unit. The invention also comprises the specific apparatus shown.

I claim as my invention:

1. In a dehydrator for removing water from petroleum oils, the combination of: a container, cylinders forming an annular chamber entirely submerged in the fluid carried in said container; means for carrying a body of water in the bottom of said container; means for supplying a heating medium to said annular chamber; means for passing the emulsion to be treated upwardly through the center of said cylinders; an apron extending downwardly outside said cylinders and having its lower edge dipping below the water carried in said container so that the emulsion to be treated must pass around said edge and through said water to get to the space outside said apron; and means for withdrawing treated oil from the space outside said apron.

2. In a dehydrator for removing water from petroleum oils, the combination of: a container, cylinders forming an annular chamber entirely submerged in the fluid carried in said container; means for carrying a body of water in the bottom of said container; means for supplying a heating medium to said annular chamber; means for passing the emulsion to be treated upwardly through the center of the said cylinders; an apron extending downwardly outside said cylinders and having its lower edge dipping below the water carried in said container so that the emulsion to be treated must pass around said edge and through said water to get to the space outside said apron; a perforated distributor for finely dividing said emulsion as it passes around said edge; and means for withdrawing treated oil from the space outside said apron.

3. In a dehydrator, for removing water from petroleum oils, the combination of: a series of containers; walls forming an annular chamber in each container; means for supplying a heating medium to each of said annular chambers; a cylinder inside each of said containers outside said annular chambers, the upper end of each of said cylinders being connected in gas tight relationship to the top of its container; means for introducing the oil to be treated into the lower portion of a cylindrical opening inside the annular chamber of the first container; means for delivering oil from each container, except the last, from the space between said cylinder and said container to the lower portion of the cylindrical opening inside the annular chamber of a succeeding container; means for withdrawing water from the bottom of said containers; and means for withdrawing cleaned oil from the space between the cylinder and the container of the last container.

4. In a dehydrator, for removing water from petroleum oils, the combination of: a series of containers; walls forming an annular chamber in each container; means for supplying a heating medium to each of said annular chambers; a cylinder inside each of said containers outside said annular chambers, the upper end of each of said cylinders being connected in gas tight relationship to the top of its container; means for introducing the oil to be treated into the lower portion of a cylindrical opening inside the annular chamber of the first container; means for delivering oil from each container, except the last, from the space between said cylinder and said container to the lower portion of the cylindrical opening inside the annular chamber of a succeeding container; means for delivering water from the bottom of each container except the first to a preceding container; means for withdrawing water from the first container; and means for withdrawing cleaned oil from the space between the cylinder and the container of the last container.

5. In a dehydrator, for removing water from petroleum oils, the combination of: a series of containers; walls forming an annular chamber in each container; means for supplying a heating medium to each of said annular chambers; a cylinder inside each of said containers outside said annular chambers, the upper end of each of said cylinders being connected in gastight relationship to the top of its container and the lower end of each of said cylinders extend below a body of water in said container; means for introducing the oil to be treated into the lower portion of a cylindrical opening inside the annular chamber of the first container; means for delivering oil from each container, except the last, from the space between said cylinder and said container to lower portion of the cylindrical opening inside the annular chamber of a succeeding container; means for withdrawing water from the bottom of said containers; and means for withdrawing cleaned oil from the space between the cylinder and the container of the last container.

6. In a dehydrator, for removing water from petroleum oils, the combination of: a series of containers; walls forming an annular chamber in each container; means for supplying a heating medium to each of said annular chambers; a cylinder inside each of said containers outside said annular chambers, the upper end of each of said cylinders being connected in gas tight relationship to the top of its container and the lower end of each of said cylinders extending below a body of water in said container; means for introducing the oil to be treated into the lower portion of a cylindrical opening inside the annular chamber of the first container; means for delivering oil from each container, except the last, from the space between said cylinder and said container to the lower portion of the cylindrical opening inside the annular chamber of a succeeding container; means for delivering water from the bottom of each container except the first to a preceeding container; means for withdrawing water from the first container; and means for withdrawing cleaned oil from the space between the cylinder and the container of the last container.

In testimony whereof, I have hereunto set my hand at Los Angeles, California, this 29th day of January 1921.

RICHARD GIRARD JONES.